(12) United States Patent
Abdallah et al.

(10) Patent No.: US 10,467,010 B2
(45) Date of Patent: Nov. 5, 2019

(54) METHOD AND APPARATUS FOR NEAREST POTENTIAL STORE TAGGING

(71) Applicant: Intel Corporation, Santa Clara, CA (US)

(72) Inventors: Mohammad A. Abdallah, El Dorado Hills, CA (US); Mandeep Singh, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 14/209,736

(22) Filed: Mar. 13, 2014

(65) Prior Publication Data

US 2014/0281409 A1    Sep. 18, 2014

Related U.S. Application Data

(60) Provisional application No. 61/792,885, filed on Mar. 15, 2013.

(51) Int. Cl.
*G06F 9/38* (2018.01)
*G06F 9/30* (2018.01)

(52) U.S. Cl.
CPC ........ *G06F 9/3834* (2013.01); *G06F 9/30043* (2013.01); *G06F 9/3836* (2013.01); *G06F 9/3842* (2013.01); *G06F 9/3855* (2013.01)

(58) Field of Classification Search
CPC .. G06F 9/30043; G06F 9/3834; G06F 9/3836; G06F 9/3855
See application file for complete search history.

(56) References Cited

U.S. PATENT DOCUMENTS 5,651,124 A   7/1997   Shen et al.
5,651,125 A   7/1997   Witt et al.
(Continued)

FOREIGN PATENT DOCUMENTS

TW   201250583   12/2012

OTHER PUBLICATIONS

Pong P. Chu, "RTL Hardware Design Using VHDL", 2006, John Wiley & Sons, pp. 279-281.
(Continued)

*Primary Examiner* — Aimee Li
*Assistant Examiner* — Courtney P Carmichael-Moody
(74) *Attorney, Agent, or Firm* — NDWE LLP (57) ABSTRACT

A method for performing memory disambiguation in an out-of-order microprocessor pipeline is disclosed. The method comprises storing a tag with a load operation, wherein the tag is an identification number representing a store instruction nearest to the load operation, wherein the store instruction is older with respect to the load operation and wherein the store has potential to result in a RAW violation in conjunction with the load operation. The method also comprises issuing the load operation from an instruction scheduling module. Further, the method comprises acquiring data for the load operation speculatively after the load operation has arrived at a load store queue module. Finally, the method comprises determining if an identification number associated with a last contiguous issued store with respect to the load operation is equal to or greater than the tag and gating a validation process for the load operation in response to the determination.

15 Claims, 9 Drawing Sheets

(56) References Cited

U.S. PATENT DOCUMENTS

| | | | |
|---|---|---|---|
| 5,751,983 A * | 5/1998 | Abramson | G06F 9/3834 712/216 |
| 5,881,262 A * | 3/1999 | Abramson | G06F 9/30043 712/216 |
| 5,953,520 A | 9/1999 | Mallick | |
| 5,987,595 A | 11/1999 | Yoaz et al. | |
| 6,266,744 B1 * | 7/2001 | Hughes | G06F 9/3834 711/123 |
| 6,301,654 B1 * | 10/2001 | Ronchetti | G06F 9/30043 712/204 |
| 6,393,536 B1 * | 5/2002 | Hughes | G06F 9/3838 711/118 |
| 6,463,522 B1 * | 10/2002 | Akkary | G06F 9/3834 712/216 |
| 6,584,529 B1 | 6/2003 | Thomas | |
| 7,107,437 B1 | 9/2006 | Padwekar | |
| 7,181,598 B2 | 2/2007 | Jourdan et al. | |
| 7,434,031 B1 | 10/2008 | Spracklen et al. | |
| 7,600,097 B1 * | 10/2009 | Wright | G06F 9/30167 712/216 |
| 7,734,895 B1 | 6/2010 | Agarwal et al. | |
| 8,099,566 B2 | 1/2012 | Luttrell | |
| 8,438,334 B2 | 5/2013 | Bell et al. | |
| 8,769,241 B2 | 7/2014 | Chiang et al. | |
| 8,832,354 B2 | 9/2014 | Sokolov et al. | |
| 2002/0042863 A1 | 4/2002 | Jeddeloh | |
| 2002/0194464 A1 | 12/2002 | Henry et al. | |
| 2005/0247774 A1 * | 11/2005 | Sander | G06F 9/3826 235/375 |
| 2006/0026408 A1 | 2/2006 | Morris et al. | |
| 2009/0049234 A1 | 2/2009 | Oh et al. | |
| 2010/0153690 A1 | 6/2010 | Vick et al. | |
| 2010/0274973 A1 | 10/2010 | Balakrishnan | |
| 2010/0293347 A1 * | 11/2010 | Luttrell | G06F 9/3851 711/156 |
| 2011/0153307 A1 | 6/2011 | Winkel et al. | |
| 2011/0231593 A1 | 9/2011 | Yasufuku et al. | |
| 2013/0298127 A1 * | 11/2013 | Meier | G06F 9/3834 718/100 |
| 2014/0229718 A1 * | 8/2014 | Jackson | G06F 9/3834 712/225 |
| 2014/0258696 A1 | 9/2014 | Srikantaiah | |
| 2014/0281384 A1 | 9/2014 | Zeng | |
| 2014/0281408 A1 | 9/2014 | Zeng | |
| 2014/0281410 A1 | 9/2014 | Abdallah | |
| 2014/0317351 A1 | 10/2014 | Rao et al. | |

OTHER PUBLICATIONS

Final Office Action from U.S. Appl. No. 14/063,173, dated Feb. 16, 2017, 15 pages.

Final Office Action from U.S. Appl. No. 14/063,409, dated Feb. 15, 2017, 16 pages.

Non-Final Office Action from U.S. Appl. No. 14/063,173, dated Jul. 14, 2016, 49 pages.

Non-Final Office Action from U.S. Appl. No. 14/063,409, dated Jul. 14, 2016, 49 pages.

* cited by examiner

| Cycle 1 | Cycle 4 | Cycle 2 | Cycle 3 |
|---|---|---|---|
| Insn 1 | Insn 2 | Insn 3 | Insn 4 |
| Add r2 r1, r9 <br><br> 257 | Str [r7(0x4000) r2 (0x1)] <br><br> 258 | Ldr r9 [r8(0x4000)] <br><br> 259 | Sub r1 r9, r14 <br><br> 260 |

| ID | Instruction | NPRS |
|---|---|---|
| 12 | ST m[%r1], %r3 | X |
| 13 | | 12 |
| 14 | | 12 |
| 15 | | 12 |
| 16 | ST m[%r4], %r5 | 12 |
| 17 | | 16 |
| 18 | | 16 |
| ... | ... | ... |
| 27 | LD %r7, m[%5] | 16 |

657 — (row ID 12)
658 — (row ID 16)
659 — (row ID 27)

Index
ID: Instruction ROB Identifier
ST: Store Instruction
LD: Load Instruction
NPRS: Nearest Potential RAW Store

FIG. 6

| ID | Instruction | NPRS | ISV |
|---|---|---|---|
| 12 | ST m[%r1], %r3 | X | 1 |
| 13 | | 12 | 1 |
| 14 | ST m[%r9], %r2 | 12 | 0 |
| 15 | | 14 | 1 |
| 16 | ST m[%r4], %r5 | 14 | 1 |
| 17 | | 16 | 0 |
| 18 | | 16 | 1 |
| ... | ... | ... | ... |
| 27 | LD %r7, m[%5] | 16 | 1 |

LCIS = 12

Index
ID: Instruction ROB Identifier
ST: Store Instruction
LD: Load Instruction
NPRS: Nearest Potential RAW Store
ISV: Issue Valid
LCIS: Latest/Last Contiguous Issue Store

FIG. 7

| ID | Instruction | NPRS | ISV |
|----|-------------|------|-----|
| 12 | ST m[%r1], %r3 | X | 1 |
| 13 |  | 12 | 1 |
| 14 | ST m[%r9], %r2 | 12 | 1 |
| 15 |  | 14 | 1 |
| 16 | ST m[%r4], %r5 | 14 | 1 |
| 17 |  | 16 | 0 |
| 18 |  | 16 | 1 |
| ... | ... | ... | ... |
| 27 | LD %r7, m[%5] | 16 | 1 |

LCIS = 16

Index
ID: Instruction ROB Identifier
ST: Store Instruction
LD: Load Instruction
NPRS: Nearest Potential RAW Store
ISV: Issue Valid
LCIS: Latest/Last Contiguous Issue Store

METHOD AND APPARATUS FOR NEAREST POTENTIAL STORE TAGGING

CROSS REFERENCE TO RELATED APPLICATIONS

This application is a conversion of and claims priority to and the benefit of Provisional Patent Application No. 61/792,885, entitled "METHOD AND APPARATUS FOR NEAREST POTENTIAL STORE TAGGING," having a filing Date of Mar. 15, 2013, which is herein incorporated by reference in its entirety.

FIELD OF THE INVENTION

Embodiments according to the present invention generally relate to microprocessor architecture and more particularly to the architecture for out-of-order microprocessors.

BACKGROUND OF THE INVENTION

In an Out-Of-Order ("OOO") microprocessor, instructions are allowed to issue and execute out of their program order. For example, the scheduler in an OOO processor can issue and execute a load before a previous store writes to the same memory location. Memory dependencies can therefore exist between such a load and a prior store that needs to access the same memory address. The OOO machine typically needs to address the errors that result from a load returning wrong data because it attempts to access a memory location before a prior occurring store has written to the same memory location. This type of error is known as a memory read-after-write (RAW) violation. Further, the load and store pair is typically referred to as "aliasing" because it is targeting the same memory address.

Memory disambiguation is a set of techniques employed by high-performance out-of-order execution microprocessors that execute memory access instructions (loads and stores) out of program order. The mechanisms for performing memory disambiguation, implemented using digital logic inside the microprocessor core, detect true dependencies between memory operations at execution time and allow the processor to recover when a dependence has been violated. They also eliminate spurious memory dependencies and allow for greater instruction-level parallelism by allowing safe out-of-order execution of loads and stores.

Figure 1A:
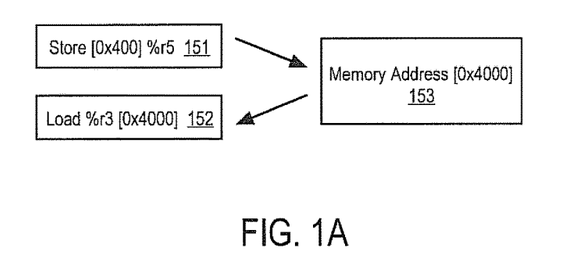
FIGS. 1A-1B illustrate certain typical problems that can arise as a result of out-of-order execution of loads and stores in an OOO machine.
Figure 1B:
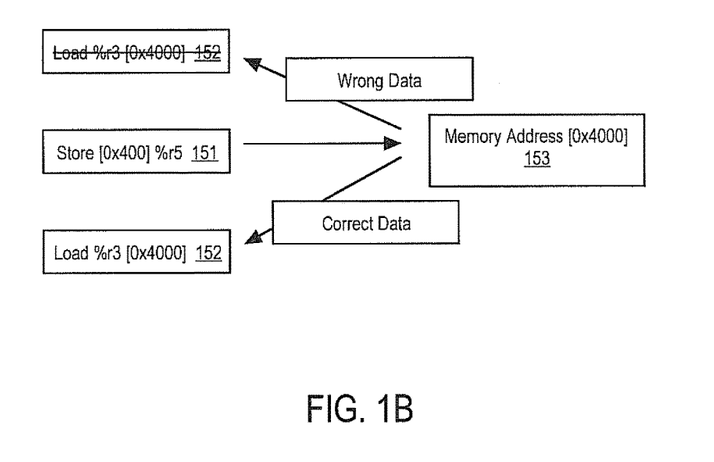

FIGS. 1A-1B illustrate a typical RAW violation that can arise as a result of out-of-order execution of loads and stores in an OOO machine. FIG. 1A shows that a later load instruction 152 loads data from the same memory address [0x4000] 153 that a previous store 151 writes to. Accordingly, the load 152 should store the same value in register r3 as that stored in register r5 by store instruction 151. As shown in FIG. 1B, if the load instruction 151 is executed before the store, it will load incorrect data. This is known as a RAW violation as discussed above. In order to recover from the violation, the pipeline will need to be flushed and the load instruction along with other instructions dependent on it will need to re-execute. Because of the high computational penalty of a flush operation, it is important to avoid this kind of re-execution from happening in a high performance CPU.

Figure 2:
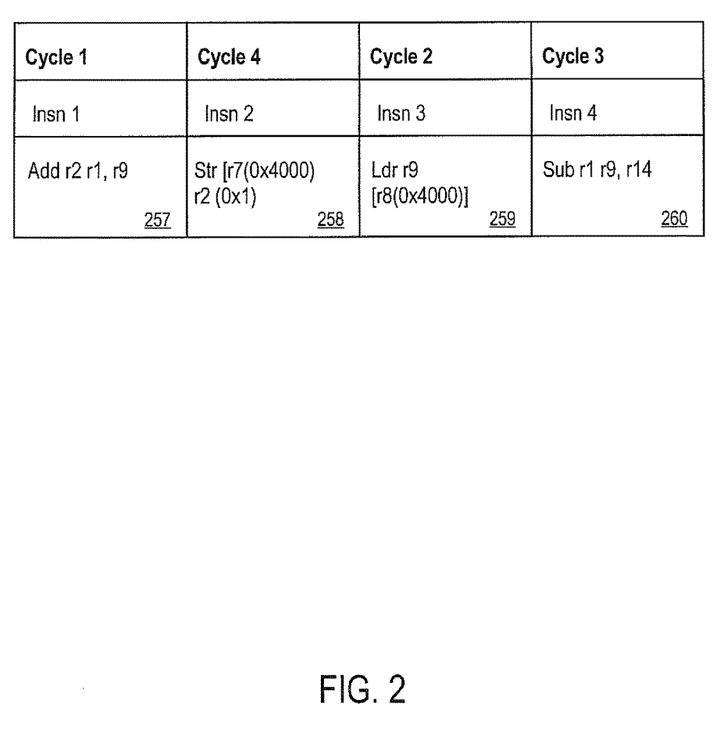
FIG. 2 illustrates a more detailed example of how a conventional OOO microprocessor handles a memory read-after-write violation.

FIG. 2 illustrates a more detailed example of how a conventional OOO microprocessor handles a memory read-after-write ("RAW") violation. Instruction 1 257, Instruction 2 258, Instruction 3 259, and Instruction 4 260 are in program order. However, in an OOO machine, Instruction 3 259, the load instruction, can execute during cycle 2 before Instruction 2 258, which is a store instruction that executes in cycle 4 and accesses the same memory location [0x4000] as the load instruction 259. If load instruction 259 executes in a prior cycle from the store instruction 258, it will get wrong data from memory location [0x4000]. Accordingly, the wrong data will be stored in register r9 by load instruction 259. Further, Instruction 4 260 may execute in cycle 3 using the wrong data from the load instruction 259.

In order to correct the errors resulting from this RAW violation, both instructions 259 and 260 are invalidated and need to re-execute following a pipeline flush. The load instruction 259 will receive the correct data from the store instruction 258 during the re-execution, however, a severe computational penalty is paid in order to perform the pipeline flush and re-execution.

Figure 3:
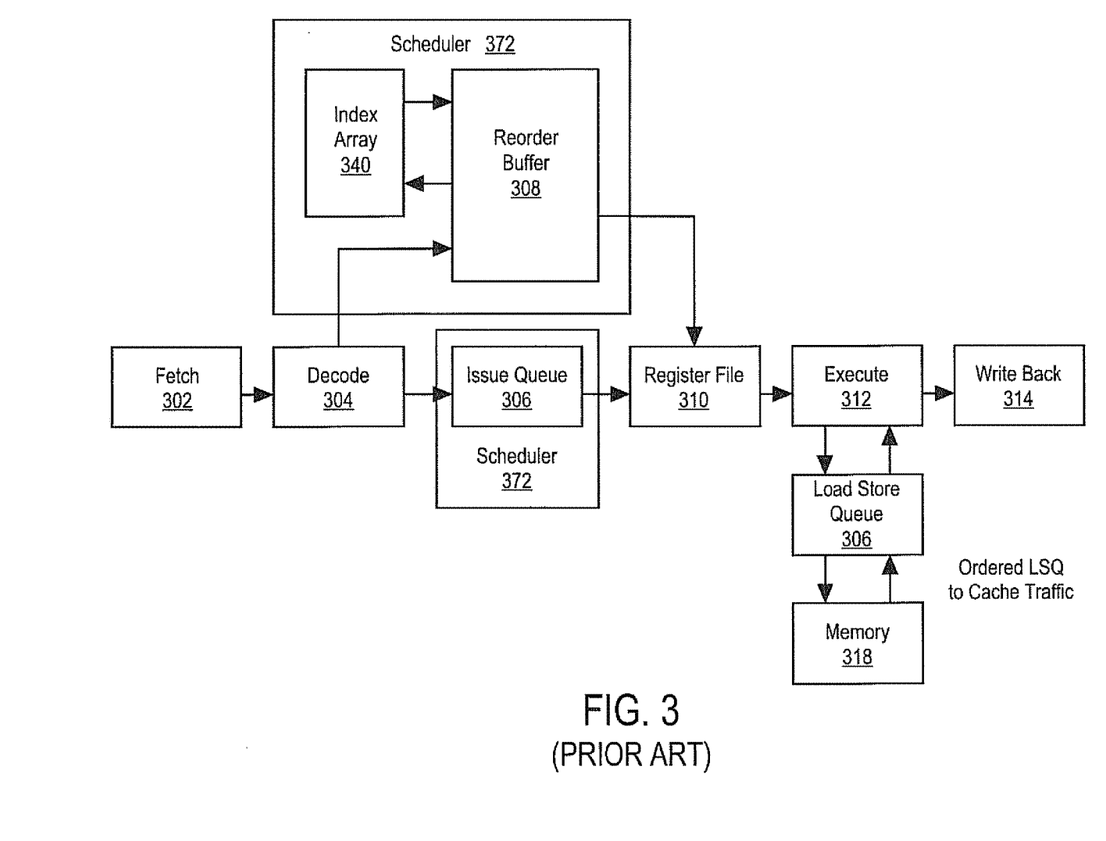
FIG. 3 illustrates an exemplary pipeline for a conventional OOO microprocessor.

FIG. 3 illustrates a pipeline for a conventional OOO microprocessor. Instructions are fetched at the fetch stage 302 and placed in the instruction fetch queue (IFQ) (not shown) within fetch stage 302. The instructions are generally the original assembly instructions found in the executable program. These instructions reference the architectural registers which are stored in register file 310. If the first fetched instruction was to be interrupted or raise an exception, the architectural register file 310 stores the results of all instructions until that point. Stated differently, the architectural register file stores the state that needs to be saved and restored in order to return back to the program during debugging or otherwise.

In an OOO microprocessor, the instructions execute out of order while still preserving data dependence constraints. Because instructions may finish in an arbitrary order, the architectural register file 310 cannot be modified by the instructions as they finish because it would make it difficult to restore their values accurately in the event of an exception or an interrupt. Hence, every instruction that enters the pipeline is provided a temporary register where it can save its result. The temporary registers are eventually written into the architectural register file in program order. Thus, even though instructions are being executed out of order, the contents of the architectural register files change as though they were being executed in program order.

The ROB 308 facilitates this process. After the instructions are dispatched from the fetch unit 302, they are decoded by decode module 304 and are placed in the ROB 308 and issue queue 306 (IQ). The ROB 308 and IQ 306 may be part of a scheduler module 372. As instructions are issued out of IQ 306 out of order, they are executed by execute module 312.

In one embodiment, the write back module 314 will write the resulting values from those instructions back to the temporary registers in ROB 308 and rely on the ROB 308 to facilitate committing the instructions in order. However, in a different embodiment, write back module 314 writes the values resulting from instruction execution directly into register file 310 without sorting them. The unordered elements are added in physical memory to the register file 310 in an unordered fashion and are then retired to the architectural files in order at the retirement stage using a ROB initiated protocol.

The instructions issued out of order from the IQ 306 may also comprise loads and stores. As explained above, when loads and stores are issued out of order from the IQ 306, there are memory dependencies between them that need to be resolved before those instructions can be committed. Accordingly, the store instructions are stored in order in a Load Store Queue (LSQ) 316 while the dependencies between the loads and stores are resolved with the help of ROB 308.

A load instruction uses registers in the register file 310 to compute an effective address and, subsequently, brings the data from that address in memory 318 into a register in register file 310. The store similarly uses registers in the register file 310 to compute an effective address, then transfers data from a register into that address in memory 318. Hence, loads and stores must first wait for register dependencies to be resolved in order to compute their respective effective address. Accordingly, each store instruction is queued in order in a load/store queue (LSQ) 316 while it is waiting for a register value to be produced—when it receives the broadcast regarding its availability, the effective address computation part of the store is issued.

The Load Store Queue ("LSQ") is a component in a conventional OOO microprocessor pipeline that aids memory disambiguation. One of the key requirements for the LSQ is availability of information that allows age order determination between loads and stores. Stated differently, the LSQ requires information that allows it to order the various loads and stores based on age. For example, for a memory load operation to successfully complete, the LSQ must confirm that all stores, older in age order present no RAW hazard and no younger loads incorrectly create hazards with loads to the same address.

In an In-Order machine, this is a relatively easy design because the operations arrive at the LSQ in program order and, consequently, also in age order. In an OOO processor, however, the memory operations arrive at LSQ out of order. One of the problems this causes is that it requires all the stores older to a certain load operation to be monitored by some module within the microprocessor pipeline, e.g., a scheduler 372. This needs to be done to assist the load operation in determining the completion status of all older stores which in turn is needed to make a final decision as to whether the data the load operation has acquired is correct or whether it has the potential to encounter a hazard with a conflicting store.

Store instructions are queued in order in a LSQ of a conventional OOO processor because when stores are issued out of order from the IQ 306, there are memory dependencies between loads and the store instructions that need to be resolved before they can access memory 318 as discussed above. For example, a load can access the memory only after it is confirmed there are no prior stores that refer to the same address. It is, once again, the ROB 308 that is used to keep track of the various dependencies between the stores and the loads.

Further, in conventional OOO processors, the scheduler 372 can also comprise an index array 340 that the ROB 308 communicates with in order to track the various dependencies. The index array 340 is used to store tags that the ROB 308 assigns to all load and store instructions that are dispatched from IQ 306. These tags are used to designate slots in the LSQ 316 for the store instructions, so that the instructions can be allocated in the LSQ 316 in program order. This, in turn, allows memory 318 to be accessed by the store instructions in program order. As a result, in conventional OOO processors, additional storage can be required within the scheduler 372 for an index array 340 that stores tags for the respective locations of store instructions in the LSQ. Further, additional communication overhead is required to communicate tag related information between the scheduler 372 and LSQ 316.

A significant disadvantage to conventional OOO processor methods of addressing memory operation disambiguation then is that using the scheduler 372 with index array 340, for example, to track dependencies in the LSQ introduces unnecessary delay because of the communication latency involved with communicating tags between the LSQ 316 and scheduler 372. Further, the requirements to queue stores in LSQ 316 in program order in conventional OOO processor designs results in additional computational penalty. Finally, in conventional OOO processors, LSQ 316 may need to constantly check a load operation to determine the completion status of all older stores with respect to the load operation, which can also introduce additional computational cost.

BRIEF SUMMARY OF THE INVENTION

Accordingly, a need exists for a method and apparatus for a more efficient and flexible tagging approach in an OOO processor architecture, whereby, each load operation carries with it a tag that is used to decide whether to validate the data it acquires from any source. This obviates the need to maintain an index array 340 within a scheduler module 372, as shown in FIG. 1, and, as a result, advantageously reduces any latency associated with communicating tag related information between the scheduler 372 and LSQ 316.

Further, in one embodiment of the present invention, each load uses the tag it carries with it in combination with a global signal from the instruction ROB to access all the information required to make the decision regarding validation of data acquired from any source by the load operation. This is advantageous because it allows each load operation to make a single determination as to whether there are any pending stores older than the load itself as compared with the constant spin loop checking for a final status employed in conventional OOO processors. Another significant advantage of the present invention is that there is no longer a need to keep the LSQ ordered because all the load operation needs to validate the data acquired is the tag stored with it and the globally available signal.

In one embodiment, a method for performing memory disambiguation in an out-of-order microprocessor pipeline is disclosed. The method comprises storing a tag with a load operation, wherein the tag is an identification number representing a store instruction nearest to the load operation, wherein the store instruction is older with respect to the load operation and wherein the store has potential to result in a RAW violation in conjunction with the load operation. The method also comprises issuing the load operation from an instruction scheduling module. Further, the method comprises acquiring data for the load operation speculatively after the load operation has arrived at a load store queue module. Finally, the method comprises determining if an identification number associated with a last contiguous issued store with respect to the load operation is equal to or greater than the tag and gating a validation process for the load operation in response to the determination.

In another embodiment, a processor unit configured to perform a method for performing memory disambiguation in an out-of-order microprocessor pipeline is disclosed. The method comprises storing a tag with a load operation, wherein the tag is an identification number representing a store instruction nearest to the load operation, wherein the store instruction is older with respect to the load operation and wherein the store has potential to result in a RAW violation in conjunction with the load operation. The method also comprises issuing the load operation from an instruction scheduling module. Further, the method comprises acquiring data for the load operation speculatively after the load operation has arrived at a load store queue module. Finally, the method comprises determining if an identification number associated with a last contiguous issued store with respect to the load operation is equal to or greater than the tag and gating a validation process for the load operation in response to the determination.

In a different embodiment, an apparatus configured to perform a method for performing memory disambiguation in an out-of-order microprocessor pipeline is disclosed. The apparatus comprises a memory and a processor communicatively coupled to the memory, wherein the processor is configured to process instructions out of order, and further wherein the processor is configured to: (a) store a tag with a load operation, wherein the tag is an identification number representing a store instruction nearest to the load operation, wherein the store instruction is older with respect to the load operation and wherein the store has potential to result in a RAW violation in conjunction with the load operation; (b) issue the load operation from an instruction scheduling module; (c) acquire data for the load operation speculatively after the load operation has arrived at a load store queue module; (d) determine if an identification number associated with a last contiguous issued store with respect to the load operation is equal to or greater than the tag; and (e) gate a validation process for the load operation in response to a determination of whether the identification number associated with the last contiguous issued store is equal to or greater than the tag.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

NOTATION AND NOMENCLATURE

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "issuing," "determining," "validating" or the like, refer to actions and processes (e.g., flowchart 900 of FIG. 9) of a computer system or similar electronic computing device or processor (e.g., system 410 of FIG. 4). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 4:
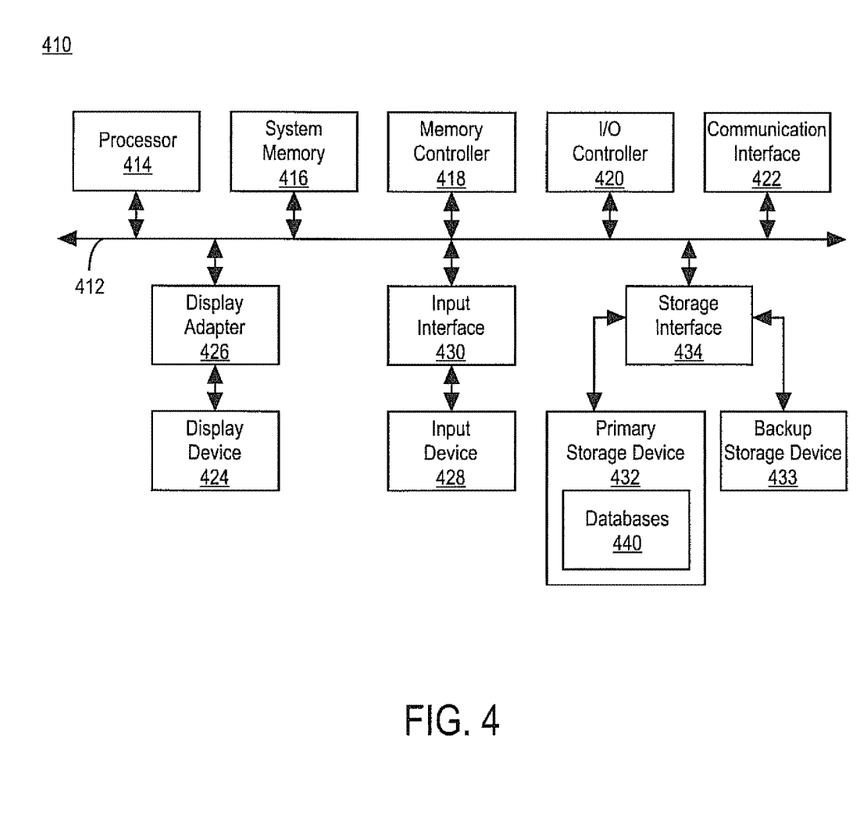
FIG. 4 is an exemplary computer system in accordance with embodiments of the present invention.

FIG. 4 is a block diagram of an example of a computing system 410 capable of being integrated with a processor 414 of an embodiment of the present disclosure. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 of an embodiment of the present invention and a system memory 416.

Processor 414 incorporates embodiments of the present invention and generally represents any type or form of processing unit capable of processing data or interpreting and executing instructions. In certain embodiments, processor 414 may receive instructions from a software application or module. These instructions may cause processor 414 to perform the functions of one or more of the example embodiments described and/or illustrated herein. In one embodiment, processor 414 may be an out of order microprocessor. In a different embodiment, processor 414 may be a superscalar processor. In yet another embodiment, processor 414 may comprise multiple processors operating in parallel.

System memory 416 generally represents any type or form of volatile or non-volatile storage device or medium capable of storing data and/or other computer-readable instructions. Examples of system memory 416 include, without limitation, RAM, ROM, flash memory, or any other suitable memory device. Although not required, in certain embodiments computing system 410 may include both a volatile memory unit (such as, for example, system memory 416) and a non-volatile storage device (such as, for example, primary storage device 432).

Computing system 410 may also include one or more components or elements in addition to processor 414 and system memory 416. For example, in the embodiment of FIG. 4, computing system 410 includes a memory controller 418, an input/output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between example computing system 410 and one or more additional devices. For example, communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In one embodiment, communication interface 422 provides a direct connection to a remote server via a direct link to a network, such as the Internet. Communication interface 422 may also indirectly provide such a connection through any other suitable connection.

Communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data for display on display device 424.

As illustrated in FIG. 4, computing system 410 may also include at least one input device 428 coupled to communication infrastructure 412 via an input interface 430. Input device 428 generally represents any type or form of input device capable of providing input, either computer- or human-generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In one example, databases 440 may be stored in primary storage device 432. Databases 440 may represent portions of a single database or computing device or it may represent multiple databases or computing devices. For example, databases 440 may represent (be stored on) a portion of computing system 410. Alternatively, databases 440 may represent (be stored on) one or more physically separate devices capable of being accessed by a computing device, such as computing system 410.

Continuing with reference to FIG. 4, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be separate devices accessed through other interface systems.

Many other devices or subsystems may be connected to computing system 410. Conversely, all of the components and devices illustrated in FIG. 4 need not be present to practice the embodiments described herein. The devices and subsystems referenced above may also be interconnected in different ways from that shown in FIG. 4. Computing system 410 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of the example embodiments described and/or illustrated herein. Additionally or alternatively, the example embodiments described and/or illustrated herein may be implemented in firmware and/or hardware.

Method and Apparatus for Nearest Potential Store Tagging

Embodiments of the present invention provide a method and apparatus for a more efficient and flexible tagging approach in an OOO processor architecture, whereby, each load operation carries with it a tag that is used to decide whether to validate the data it acquires from any source. This obviates the need to maintain an index array 340 within a scheduler module 372 of a conventional OOO processor, as shown in FIG. 1, and, as a result, advantageously reduces any latency associated with communicating tag related information between the scheduler 372 and LSQ 316. Accordingly, a load can make the determination regarding the validity of the data it acquires from any source much earlier than in conventional architectures.

Further, in one embodiment of the present invention, each load uses the tag it carries with it in combination with a global signal from the instruction ROB to access all the information required to make the decision regarding validation of data acquired from any source by the load operation. This is advantageous because it allows each load operation to make a single determination as to whether there are any pending stores older than the load itself as compared with the constant spin loop checking for a final status employed in conventional OOO processors. It is also much simpler from a logical perspective. Another significant advantage of the present invention is that there is no longer a need to keep the LSQ ordered because all the load operation needs to validate the data acquired is the tag stored with it and the globally available signal.

In one embodiment, a tagging approach is employed which allows a tagged load to recognize the address disambiguation of the nearest older store and verify that no stores remain undispatched that may potentially cause a RAW hazard easily. This is done through distributed knowledge regarding all stores older than a load. Each load, in one embodiment of the present invention, carries with it a tag that in combination with a global signal from the instruction ROB provides the load with all the information required to make the decision to validate the data it acquires from any source.

Figure 5:
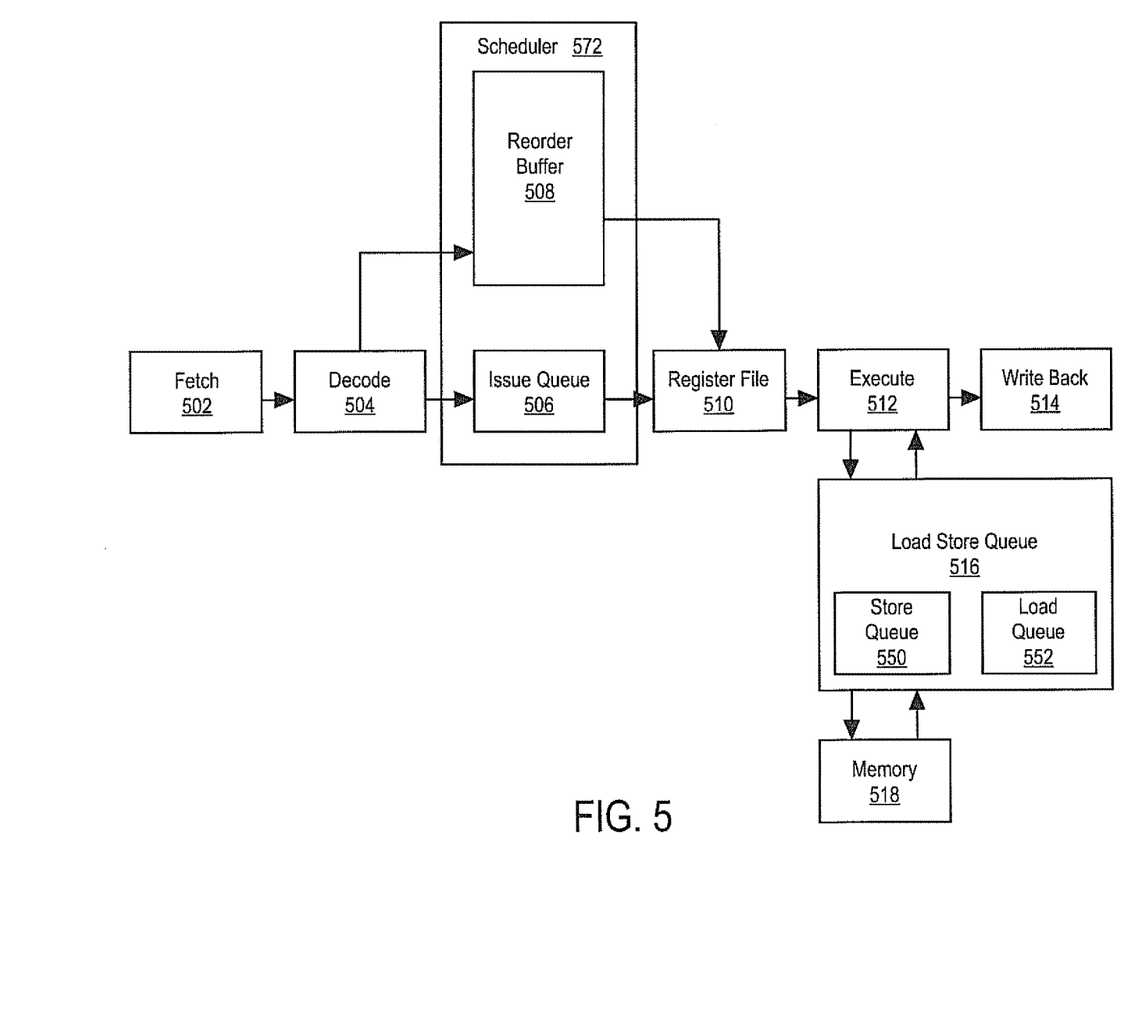
FIG. 5 is an exemplary diagram of a pipeline for an out of order microprocessor wherein the tagged load operations are stored in a Load Queue sub-structure within the LSQ and the store operations are stored in a Store Queue sub-structure within the LSQ in accordance with one embodiment of the present invention.

FIG. 5 is an exemplary diagram of a pipeline for an out of order microprocessor wherein the tagged load operations are stored in a Load Queue sub-structure within the LSQ and the store operations are stored in a Store Queue sub-structure within the LSQ in accordance with one embodiment of the present invention.

As illustrated in FIG. 5, instructions are fetched at the fetch stage 502 and place in the instruction fetch queue (IFQ) (not shown) within the fetch stage 502. These instructions reference the architectural registers, which are stored in register file 510. After the instructions are dispatched from the fetch unit 502, they are decoded by decode module 504 and are placed in the ROB 508 and issue queue 506 (IQ). In one embodiment of the present invention, the scheduler module 572 comprises the ROB 508 and IQ 506. As instructions are issued out of IQ 506 out of order using scheduler module 572, they are executed by execute module 512.

In one embodiment, the write back module 514 will write the resulting values from those instructions back to the temporary registers in ROB 508 and rely on the ROB 508 to facilitate committing the instructions in order. However, in a different embodiment, write back module 514 writes the values resulting from instruction execution directly into register file 510 without sorting them. The unordered elements are added in physical memory to the register file 510 in an unordered fashion and are then retired to the architectural files in order at the retirement stage using a ROB initiated protocol.

The LSQ 516 comprises two sub-structures, the Store Queue (SQ) 550 and the Load Queue (LQ) 552. The incoming load operations are placed in the LQ 552 while store operations arriving at the LSQ 516 are placed in SQ 550.

In one simple embodiment of the present invention, SQ 550 is ordered such that all stores arriving at the LSQ 516 are placed in program order in SQ 550. The load operations in the LQ 552 wait for the first younger store to be allocated and also wait for every older store to arrive at the LSQ and placed in SQ 550. Each of the load operations in LQ 552 would then be compared against the age of the store operations in SQ 550 as they get updated. However, through the tracking of variables NPRS (Nearest Potential Raw Store) and LCIS (Latest Contiguous Issue Store), as will be explained below, the present invention circumvents the need to place store instructions in the SQ 550 in order. Each load operation carries with a NPRS tag that in combination with a global LCIS value from the ROB 508 provides the load operation with the information needed to validate data acquired from a source.

Figure 6:
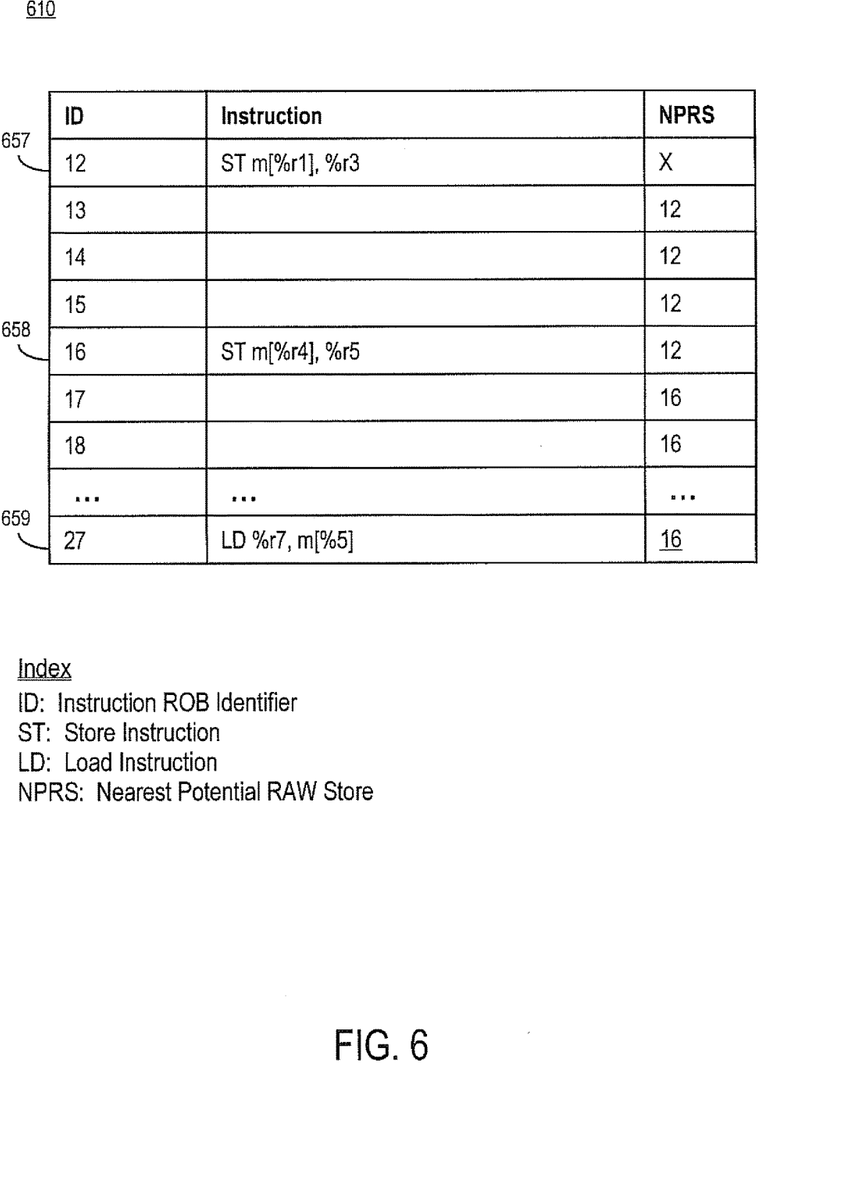
FIG. 6 illustrates how the Nearest Potential RAW Store (NPRS) value is determined for each load instruction in accordance with one embodiment of the present invention.

FIG. 6 illustrates how the Nearest Potential RAW Store (NPRS) value is determined for each load instruction in accordance with one embodiment of the present invention. In one embodiment of the present invention, a tag comprising a NPRS value is stored and maintained along with each load operation. NPRS refers to an older (age-order) store nearest or closest to a load in program order. In other words, the NPRS is a store that is older than the load operation, but is also nearest to it in program order. The tag can, for example, be a ROB assigned Identification number for the older store instruction. Or it can be the Program Counter (PC) value for the older store instruction. When an instruction stream arrives at the scheduler 572 in an OOO processor, all the instructions arrive in the order of expected execution also known as program order. Any load operation in the stream may be preceded by several stores. Of these stores, there is a possibility that a few may write to a memory address from which the load operation acquired data. However, because at the time of allocation of these instructions from the stream into the scheduler 572, the address of the memory operations is not disambiguated, this potential data dependency cannot be recognized. The load operation, nevertheless, needs to be aware that there are potential stores that could cause a RAW hazard.

The Nearest Potential RAW Store (NPRS) value is the last store in the instruction stream which may possibly cause a RAW hazard against a load operation. For example, in instruction stream 610, load 659 is preceded by two stores, instructions 657 and 658. Until store instruction 658 arrives at LSQ 516, instruction 657 provides the ID value for the NPRS as seen in the table. Once instruction 658 arrives, the NPRS value changes to 16 because store 658 with ID 16 is the closest older store to the load operation with ID 27. Accordingly, the NPRS value that load 659 is tagged with is 16.

Figure 7:
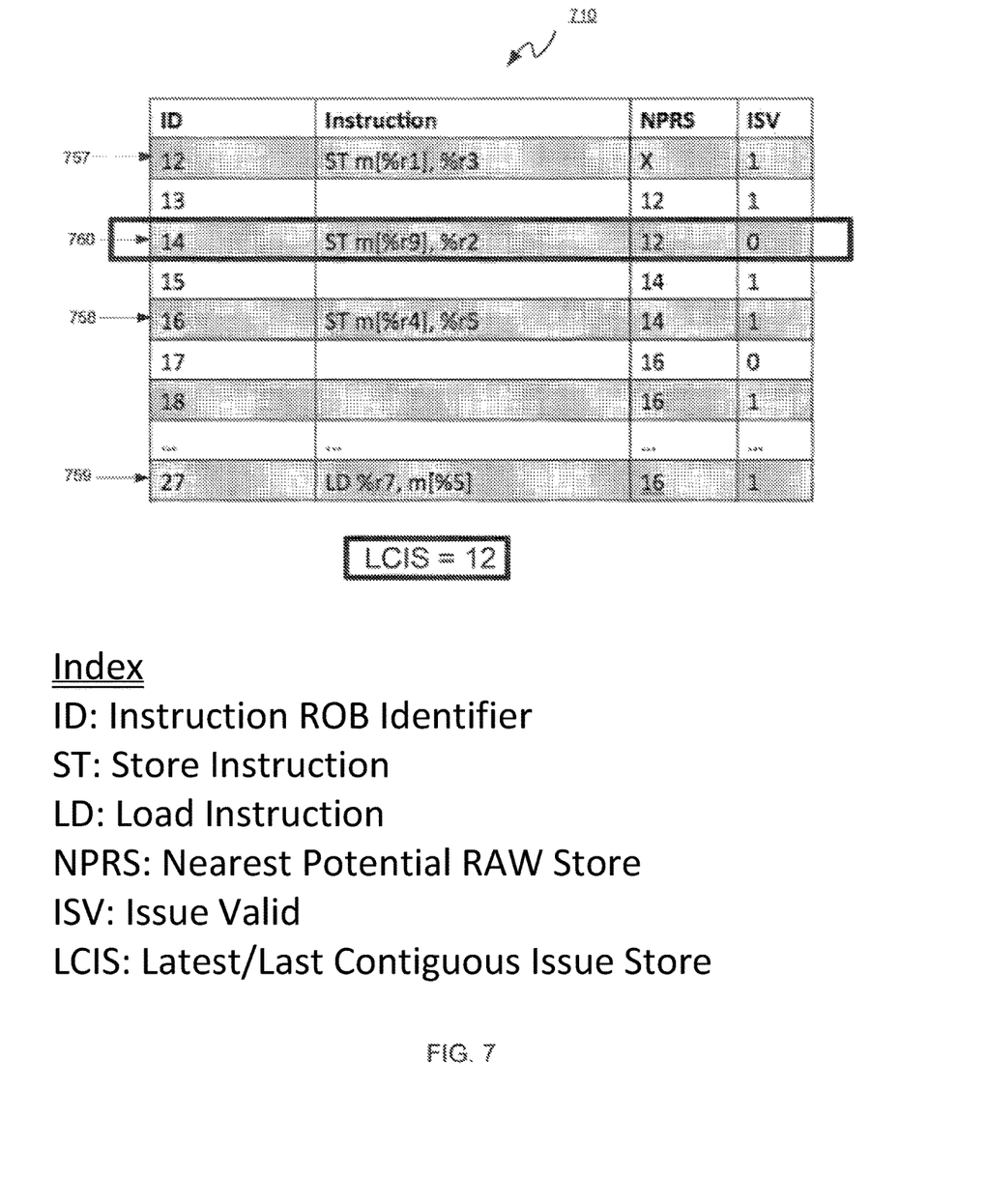
FIG. 7 illustrates how the global Latest Contiguous Issue Store (LCIS) signal value is determined in accordance with one embodiment of the present invention.

FIG. 7 illustrates how the global Latest Contiguous Issue Store (LCIS) signal value is determined in accordance with one embodiment of the present invention. The LCIS value is associated with store instructions which have been issued for execution and have thus had their address disambiguated or resolved. More precisely, LCIS indicates the position in the instruction stream up to which all store instructions have resolved their addresses and are visible to any younger loads. The LCIS signal, in one embodiment, is a global signal that is tracked by ROB 508 or scheduler 572 in general. Further, this global signal, in one embodiment, gets broadcasted by the scheduler during every pipeline cycle.

For example, FIG. 7 indicates that the LCIS value for instruction stream 710 is 12. It is important to observe that even though store instruction 758 with ID 16 has been issued (as indicated by the Issue Valid signal being asserted for store 758), the LCIS value still points to store instruction 757 with ID 12. This is a result of the status of store instruction 760 with ID 14 which has been highlighted in FIG. 7. Because store instruction 760 with ID 14 is pending issue (as indicated by the unasserted Issue Valid signal), and has not reached LSQ, there is no way for load operation 759 with ID 27 to determine if store 760 poses a RAW concern.

Figure 8:
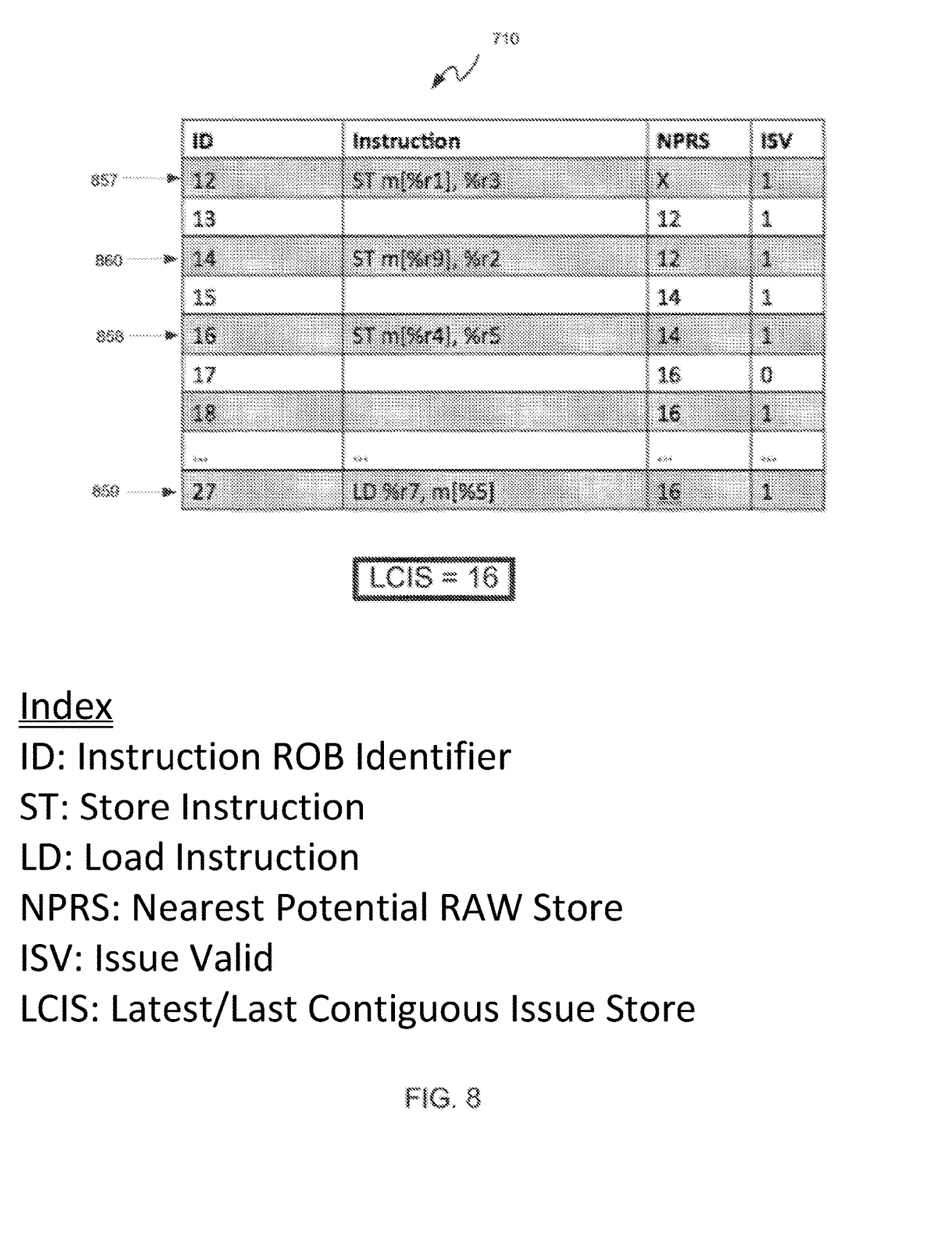
FIG. 8 illustrates how the global LCIS signal value is updated in accordance with one embodiment of the present invention.

FIG. 8 illustrates how the global LCIS signal value is updated in accordance with one embodiment of the present invention. FIG. 8 illustrates how the LCIS value is updated once store instruction 760 from FIG. 7 issues. The pointer appropriately moves to store instruction 858 with ID 16 because all store operations up to ID 16 have successfully resolved their address components. Accordingly the LCIS value is updated to 16.

In one embodiment of the present invention, when an instruction stream is presented to the scheduler 572, all the loads are tagged with their respective NPRS IDs. The maintenance of the NPRS IDs is carried out while allocating instructions into scheduler 572 and is done, in one embodiment, through an inheritance process as reflected in FIG. 6. In different embodiments, other processes can also be used. The ID of an allocated store instruction is inherited by the succeeding instructions until the next store is encountered as shown in the illustration. For example, following store instruction 657, all instructions receive an NPRS value of 12 (the ID of store 657) until store instruction 658 with ID 16 is reached. Subsequently, all instructions receive an NPRS value of 16, including load operation 659.

Once the loads have been tagged with their respective NPRS IDs, the instructions may be issued in any order that is allowed by the processor. At arrival into the LSQ 516, a load operation is placed in LQ 552 and is free to acquire data speculatively. Before performing a final validation of the data it acquires from any source, however, the load operation can, in one embodiment, perform a final verification by checking if LCIS, which is a global signal, is at least equal to or greater than the load operation's NPRS tag. This confirms that there are no stores with their address resolution pending older than the load itself. Accordingly, instead of a constant spin loop checking for a final status, the load operation can make a single determination when the event of LCIS transitioning past the NPRS value occurs.

The event of LCIS being equal to or greater than NPRS indicates that the stores that could potentially create a RAW hazard situation for the load operation have been disambiguated. Because the load operation only uses the NPRS value that it is tagged with and a global LCIS value to validate data it has acquired, the present invention obviates the need to keep the LQ 552 or SQ 550 ordered. In one embodiment, the LCIS value being equal to or greater than the NPRS value allows the load operation to resume a final address check against all the stores in the LSQ 516 to check for an impending RAW hazard. If no stores that could potentially result in a RAW hazard are found, then the load can safely be committed. The present invention, therefore, can allow a load operation to signal that it is ready to commit potentially long before the scheduler 572 is even ready to commit it.

In one embodiment, the LCIS signal and the NPRS tag can be used together to gate when an associated load operation exits the LSQ 516 to get committed.

Figure 9:
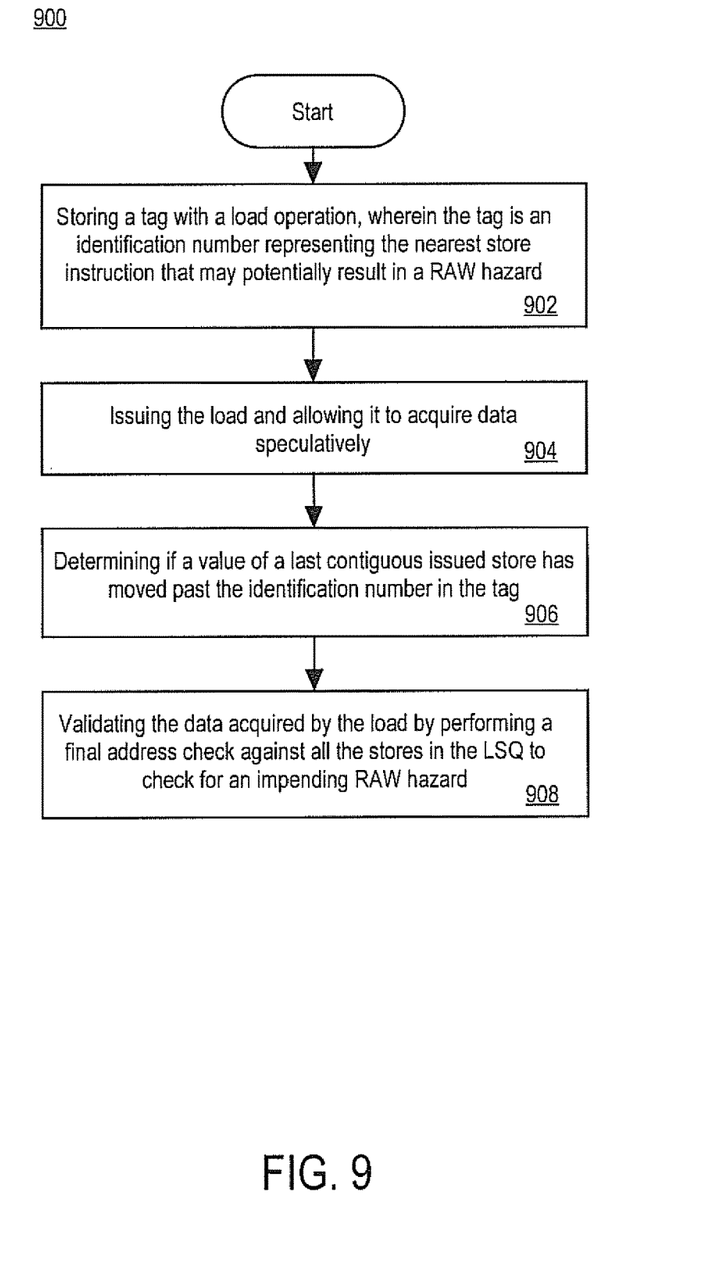
FIG. 9 depicts a flowchart for an exemplary computer controlled process for performing memory disambiguation using a NPRS value specific to the load operation and a global LCIS value in an out of order micro-architecture in accordance with embodiments of the present invention.

FIG. 9 depicts a flowchart for an exemplary computer controlled process for performing memory disambiguation using a NPRS value specific to the load operation and a global LCIS value in an out of order micro-architecture in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 6 should not be construed as limiting the scope of the invention. Rather, it will be apparent to persons skilled in the relevant art(s) from the teachings provided herein that other functional flows are within the scope and spirit of the present invention. Flowchart 600 may be described with continued reference to exemplary embodiments described above, though the method is not limited to those embodiments.

At step 902, a load is tagged with its respective NPRS ID as discussed above. The NPRS is an identification number that represents the last store in an instruction stream prior to the load which may possibly cause a RAW hazard against the load.

At step 904, the load can be issued from scheduler 572. As discussed above, the load along with other instructions may be issued in any order that is allowed by the processor. At arrival into LSQ 516, the load is free to acquire data speculatively.

At steps 906 and 908, the data acquired by the load is validated. This is done by first checking if LCIS, which is a global signal, at least equals or has moved past the load operation's NPRS tag. This confirms that there are no stores with their address resolution pending older than the load itself.

After confirming that the LCIS global value is at least equal to or greater than the load operation's NPRS tag, at step 908 the data acquired by the load is validated by performing a final address check against all the stores in the LSQ to check for an impending RAW hazard. If no aliasing stores that could potentially result in a RAW hazard are found, then the load can safely be committed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for performing memory disambiguation in an out-of-order microprocessor pipeline, said method comprising:

storing a tag with a load operation, wherein said tag is an identification number representing a store instruction nearest to said load operation, wherein said store instruction is older with respect to said load operation and wherein said store has potential to result in a read-after-write (RAW) violation in conjunction with said load operation if said store instruction targets a same memory address as said load operation;

issuing said load operation from an instruction scheduling module;

acquiring data for said load operation speculatively after said load operation has arrived at a load store queue module;

determining if an identification number associated with a last contiguous issued store with respect to said load operation is equal to or greater than said tag, wherein said identification number of said last contiguous issued store indicates a position in an instruction stream to which all store instructions have been resolved and is associated with a global signal tracked by a reorder buffer (ROB), wherein the last contiguous issued store was issued for execution prior to determining if the identification number associated with the last contiguous issued store is equal to or greater than said tag;

in response to a determination that said identification number associated with said last contiguous issued store is equal to or greater than said tag, validating said data acquired by said load operation by performing an address check against stores in said load store queue module to determine if any of said stores has potential to result in a RAW hazard, wherein said stores are older than said load operation; and broadcasting, in the out-of-order microprocessor pipeline, said identification number associated with said last contiguous issued store during every cycle of said out-of-order microprocessor pipeline.

2. The method of claim 1, further comprising:
committing said load operation in response to a determination that none of said stores has potential to result in the RAW hazard.

3. The method of claim 1, wherein said determining is performed in response to said instruction scheduling module broadcasting said identification number associated with said last contiguous issued store.

4. The method of claim 1, wherein said identification number associated with said tag is assigned by said reorder buffer (ROB).

5. The method of claim 1, wherein said storing is performed using an inheritance process, wherein said identification number associated with said tag is inherited from an instruction prior to said load operation.

6. The method of claim 1, wherein an address of the last contiguous issued store was disambiguated or resolved prior to determining if the identification number associated with the last contiguous issued store is less than said tag.

7. A processor unit configured to perform a method for performing memory disambiguation in an out-of-order microprocessor pipeline, said method comprising:
storing a tag with a load operation, wherein said tag is an identification number representing a store instruction nearest to said load operation, wherein said store instruction is older with respect to said load operation and wherein said store has potential to result in a read-after-write (RAW) violation in conjunction with said load operation if said store instruction targets a same memory address as said load operation;

issuing said load operation from an instruction scheduling module;

acquiring data for said load operation speculatively after said load operation has arrived at a load store queue module;

determining if an identification number associated with a last contiguous issued store with respect to said load operation is equal to or greater than said tag, wherein said identification number of said last contiguous issued store indicates a position in an instruction stream to which all store instructions have been resolved and is associated with a global signal tracked by a reorder buffer (ROB), wherein the last contiguous issued store was issued for execution prior to determining if the identification number associated with the last contiguous issued store is equal to or greater than said tag;

in response to a determination that said identification number associated with said last contiguous issued store is equal to or greater than said tag, validating said data acquired by said load operation by performing an address check against stores in said load store queue module to determine if any of said stores has potential to result in a RAW hazard, wherein said stores are older than said load operation; and broadcasting, in the processor unit, said identification number associated with said last contiguous issued store during every cycle of said out-of-order microprocessor pipeline.

8. The processor unit as described in claim 7, wherein said method further comprises:

committing said load operation in response to a determination that none of said stores has potential to result in the RAW hazard.

9. The processor unit as described in claim 7, wherein said determining is performed in response to said instruction scheduling module broadcasting said identification number associated with said last contiguous issued store.

10. The processor unit as described in claim 7, wherein said identification number associated with said tag is assigned by the reorder buffer (ROB).

11. The processor unit as described in claim 7, wherein said storing is performed using an inheritance process, wherein said identification number associated with said tag is inherited from an instruction prior to said load operation.

12. An apparatus configured to perform a method for performing memory disambiguation in an out-of-order microprocessor pipeline, said apparatus comprising:
a memory;
a processor communicatively coupled to said memory, wherein said processor is configured to process instructions out of order, and further wherein said processor is configured to:
store a tag with a load operation, wherein said tag is an identification number representing a store instruction nearest to said load operation in program order, wherein said store instruction is older with respect to said load operation and wherein said store has potential to result in a read-after-write (RAW) violation in conjunction with said load operation if said store instruction targets a same memory address as said load operation;

issue said load operation from an instruction scheduling module;

acquire data for said load operation speculatively after said load operation has arrived at a load store queue module;

determine if an identification number associated with a last contiguous issued store with respect to said load operation is equal to or greater than said tag, wherein said identification number of said last contiguous issued store indicates a position in an instruction stream to which all store instructions have been resolved and is associated with a global signal tracked by a reorder buffer (ROB), wherein the last contiguous issued store was executed prior to determining if the identification number associated with the last contiguous issued store is equal to or greater than said tag; and gate a validation process for said load operation in response to a determination of whether said identification number associated with said last contiguous issued store is equal to or greater than said tag, wherein the validation process comprises validating said data acquired by said load operation by performing an address check against stores in said load store queue module to determine if any of said stores has potential to result in a RAW hazard, wherein said stores are older than said load operation, wherein said instruction scheduling module is operable to broadcast, in the processor, said identification number associated with said last contiguous issued store during every cycle of said out-of-order microprocessor pipeline.

13. The apparatus of claim 12, wherein said processor is further configured to:

commit said load operation in response to a determination that none of said stores has potential to result in the RAW hazard.

14. The apparatus of claim 12, wherein said processor is further configured to determine if an identification number associated with a last contiguous issued store with respect to said load operation is less than said tag in response to said instruction scheduling module broadcasting said identification number associated with said last contiguous issued store.

15. The apparatus of claim 12, wherein said identification number associated with said tag is assigned by the reorder buffer (ROB).

* * * * *